United States Patent Office 3,494,172
Patented Feb. 10, 1970

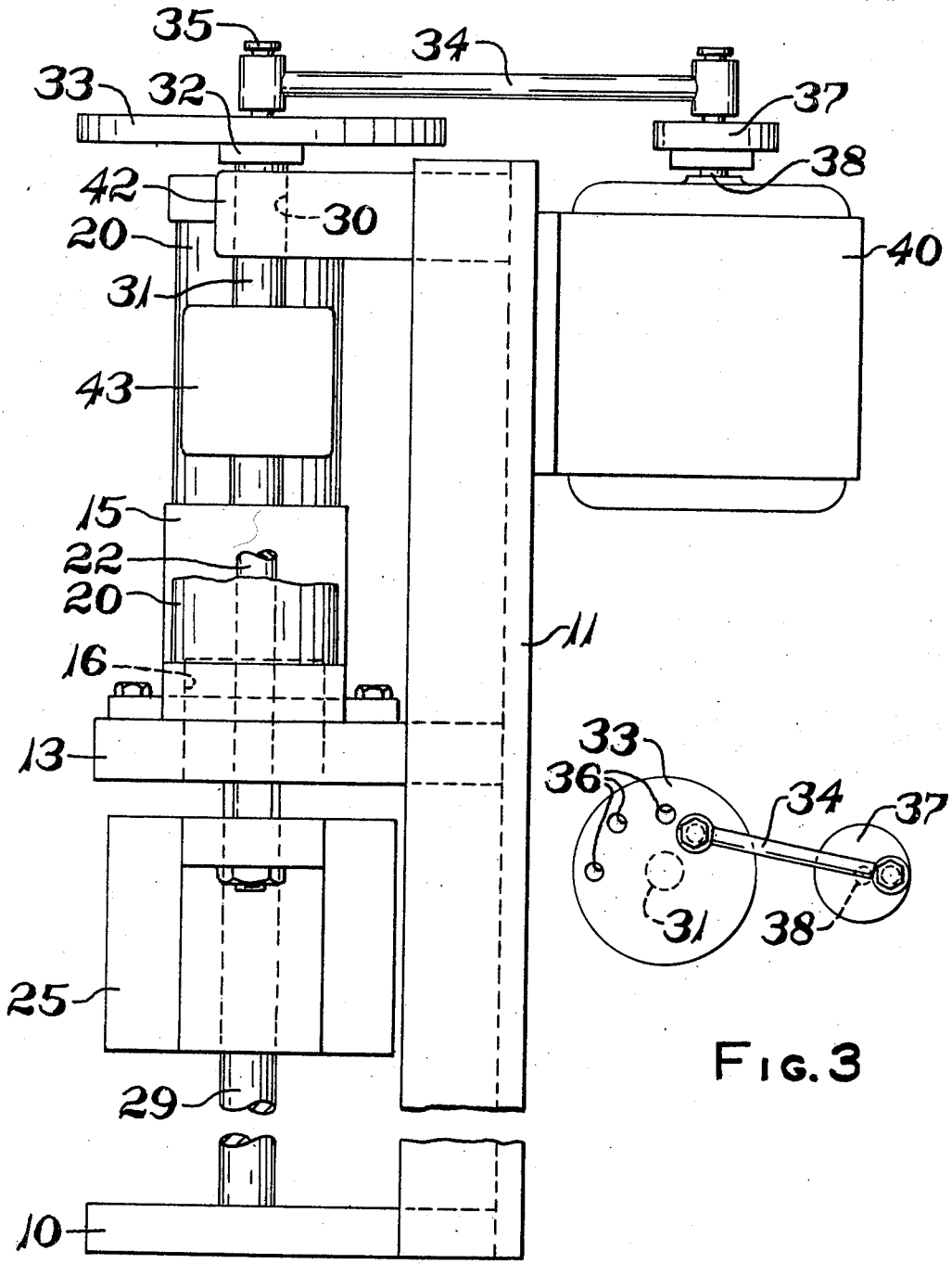

1

3,494,172
CONE CUREMETER
Arthur E. Juve, deceased, late of Peninsula, Ohio, by Ernestine Juve, executrix, Ravenna, Ohio, and Paul W. Karper, Stow, Ohio, assignors to The B. F. Goodrich Company, New York, N.Y., a corporation of New York
Filed Sept. 25, 1967, Ser. No. 670,826
Int. Cl. G01n 11/16
U.S. Cl. 73—15                                         11 Claims

ABSTRACT OF THE DISCLOSURE

An apparatus for determining the physical properties of solid and liquid vulcanizable elastomeric materials utilizing an oscillating cone shaped projection that is operative in a cone shaped cavity cooperative to define a thin walled hollow cone test chamber which is subject to an air pressure dome.

The walls of the test chamber, including the cone shaped projection, are heated to a predetermined temperature during cure while a torque sensing device is connected to such cone shaped projection to measure the variations in force required to oscillate such cone shaped projection. A recorder is connected to the torque sensing device to record the variations in force.

BACKGROUND OF THE INVENTION

In the present daily manufacturing of items made of elastomeric materials as well as in the accompanying research studies on such items, it is necessary to determine the rate and extent of vulcanization, or cure of these materials. In order to properly evaluate the development of a product for manufacturing it is necessary to determine scorch time and optimum cure time in order to control the heat history of the compound within safe processing limits. By optimum cure time is meant the time to cure the compound at a given temperature to give some optimum physical properties while the term scorch time refers to the time of the onset of cure at a given temperature. With such knowledge, the method of manufacture can be established with proper selection of temperature and time for vulcanization. In the process of establishing control over such manufacturing techniques, it often becomes necessary to use instruments on the production line to continually check specimens of a compound to insure that such compound adheres to the prescribed limits of processing. This entails an instrument that is reliable, versatile and operative to quickly provide an accurate test. In addition, it is necessary to provide an instrument that is capable of processing specimens that have low viscosity as well as those that are subject to a porous cure.

SUMMARY OF THE INVENTION

The present invention provides a single test instrument which accurately measures the dynamic properties of elastomeric materials, liquids and materials of low viscosity. In addition, such invention eliminates the sealing and bearing problem around the shaft of the rotor which was unsatisfactory in the testing of specimens of low viscosity. Further, such invention provides a faster cure which is more accurate since the specimen is relatively thin walled and thereby heats up quickly and evenly without thermal lag.

The present invention contemplates the use of a pair of spaced members cooperative to define a double coned receptacle with one driven member effective to provide a shearing force on the specimen.

2

BRIEF DESCRIPTION OF THE DRAWINGS

FIGURE 2 is a side elevational view of the apparatus.

FIGURE 3 is a plan view of the connection between the drive wheels for oscillating the rotor.

Referring to the drawings wherein like reference characters designate like or corresponding parts throughout the several views, there is shown in FIGURE 1 a base plate 10 having attached to its rear end portion an upwardly extending back plate 11. Back plate 11 has an upper bracket 12 and a lower elongated bracket 13 secured respectively to the upper end and intermediate portion thereof. Bracket 13 has a bore 14 located in the central portion thereof to receive a cylindrical member 15, which member 15 has a cylindrical recess 16 at the lower end portion thereof for a purpose to be described. Cylinder member 15 has a passageway 17 extending therethrough communicating cylindrical recess 16 with a conduit 18 which is adapted to be connected to a pressure source not shown. Secured to the respective end portions of bracket 13 are cylinders 20 which have pistons 21 and downwardly extending piston rods 22 respectively extending through bores 23 in the respective end portions of such bracket 13 for connection to a carrier member 25. Carrier member 25 has a conically shaped serrated recess 26 at its center portion which is adapted to receive a cone-shaped serrated rotor 27 for a purpose to be described. Rotor 27 has a lip 28 on its base portion for cooperation with the base of recess 26 to define a substantially closed cavity with a restrictive passageway thereby. Carrier member 25 is guided in its vertical upward and downward movement by a pair of spaced guide rods 29 which are secured to a base plate 10 and bracket 13 respectively. Upper bracket 12 has a central bore 30 which rotatably receives a shaft 31 journalled in a bushing 32 for connection to a wheel member 33 for rotation therewith. As shown in FIGURES 2 and 3, one end of a crank member 34 is pivotably mounted by means of a movable pin 35 to wheel 33. As seen in FIGURE 3, wheel 33 has a plurality of pin receiving index holes 36, each at a different radial spacing from the vertical axis of wheel 33. An eccentric drive wheel 37 is mounted on an output shaft 38 of a variable speed motor 40. The other end portion of crank 34 is pivotably mounted to such eccentric drive wheel 37 to transfer the rotational movement of shaft 38 to an oscillating motion in wheel 33 and shaft 31. The amplitude of the oscillation of wheel 33 is dependent upon the particular mounting of pin 35 in index holes 36 of the wheel 33, while the frequency of oscillation is dependent upon the output speed of the variable speed motor 40. If desired, such variable speed motor may be connected to suitable transmission means which in turn may control the speed of the output shaft 38. However, for simplicity of illustration, motor 40 is shown as directly connected to the output shaft 38.

Figure 1:
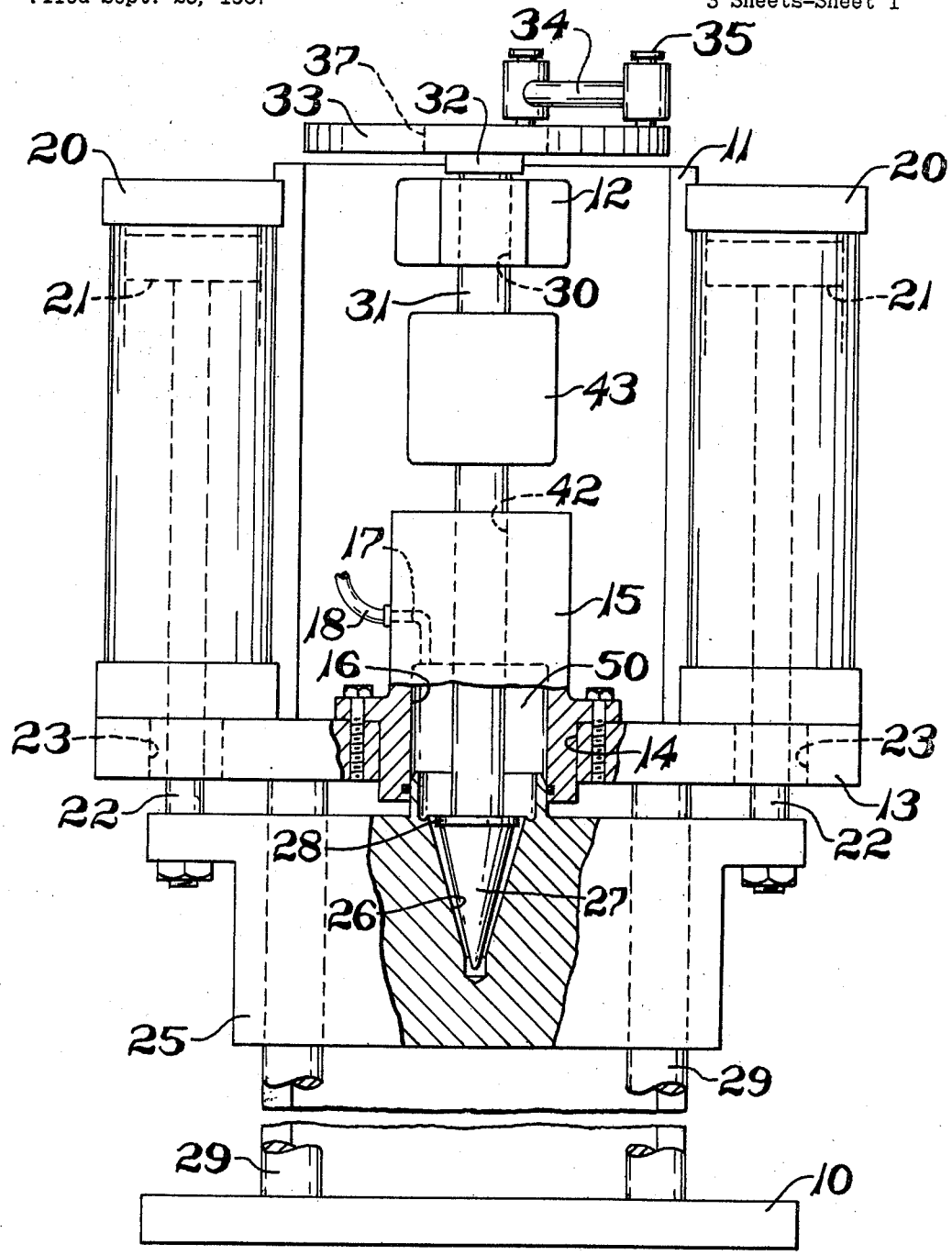
FIGURE 1 is a front elevational view of the apparatus with a portion thereof shown in cross section.
Figure 4:
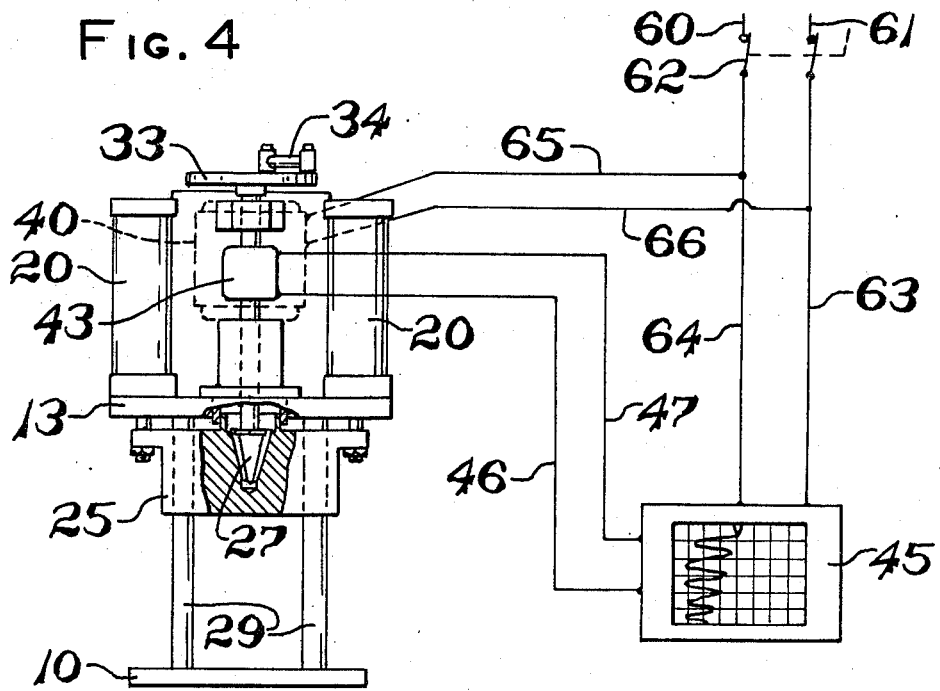
FIGURE 4 is a schematic front elevational view of the apparatus partly in section.

Shaft 31 extends downwardly through a central bore 42 in cylinder member 15 for connection to the cone rotor 27 to provide the oscillation thereto. Mounted on shaft 31 is a torque sensing pick-up device 43 which responds to torque forces in shaft 31 to actuate a torque recorder 45 through electrical lines 46 and 47. Such pick-up device 43 may comprise a bonded resistance wire strain gauge, well known in the art and therefore neither illustrated nor described, wherein such wire gauges are bonded to the shaft 31 in such a position and are so connected into a bridge circuit, that they cancel the effects of bending and thrust strains while adding the effects of torsional strain, with the relation between bridge unbalance and torsional strain being linear. Such pick-up devices are manufactured by the Baldwin-Lima-Hamilton Corporation, located in Waltham, Mass., and being known as type B torque pick up. Such devices are also manufactured by Lebow Associates, Inc., located in Oak Park, Mich.; and being known as model 2102–200.

The electrical power for the control operation is supplied by the electric lines 60 and 61 which are connected to a source of electrical power not shown. A double pole, single throw switch 62 connects lines 60 and 61 to main control lines 63 and 64 which lead to the torque pick-up recorder 45. Motor 40 receives its power supply from the lines 63 and 64 via branch lines 65 and 66. Not shown, suitable branch lines are provided to supply current to temperature control units which in turn regulate the heating coils in the carrier member 25 embedded therein and to heating coils in the rotor 27 to maintain a predetermined temperature on a sample located between the cone cavity in such carrier member 25 and the cone rotor 27. Such heating coils assure accurate controlled heating of the samples of material without thermal lag. Thermocouples are provided closely adjacent to the chamber defined by such conical bore 26 and cone rotor 27 to sense the temperature of the material confined therein. With such sample confined between the conical recesses 26 of carrier member 25 and the cone rotor 27, air pressure is maintained on such chamber through an air dome immediately above such cone rotor 27 as defined by the recess 16 through the passageway 17 which is connected to a suitable pressure source not shown. Such air pressure assures curing without porosity. The lip 28 helps to consolidate the sample in such cavity.

In the operation of the apparatus described, the operator presets or conditions carrier member 27 for the reception of a sample by energizing the upper end portion of cylinders 20 which extends the respective piston rods 22 downwardly along with carrier 25 such that a sample of material may be placed within such cavity 26, and through suitable control means, presets the temperature desired within such carrier member 25. The operator then pressurizes the rod end of cylinder 20, releasing the air pressure from the upper end portion of cylinder 20 which causes the carrier member 25 to move upwardly to the position shown in FIGURE 1 such that the sample of material is confined between the rotor 27 and the wall of cavity 26 and consolidated by lip 28. Upon energization of motor 40, rotor 27 is oscillated at a preset frequency and amplitude of oscillation. Simultaneously with such action a predetermined pressure is maintained in the air pressure dome 50, which maintains the sample in the cavity defined by the rotor 27 and the walls of the cone-shaped bore 26 of carrier member 25 to maintain a nonporous cure on the sample of material. The sample assumes a thin walled cone configuration thereby assuring a uniform faster heating than in prior test apparatus; particularly with heat supplied to both sides of the sample. This permits test curing the samples at lower temperatures by at least 10° Fahrenheit. The curing at lower temperatures avoids blistering of the material. During such action, load cell 43 will provide an output signal which may be recorded to indicate the nominal thrust during cure as indicated on the chart in FIGURE 5.

Figure 5:
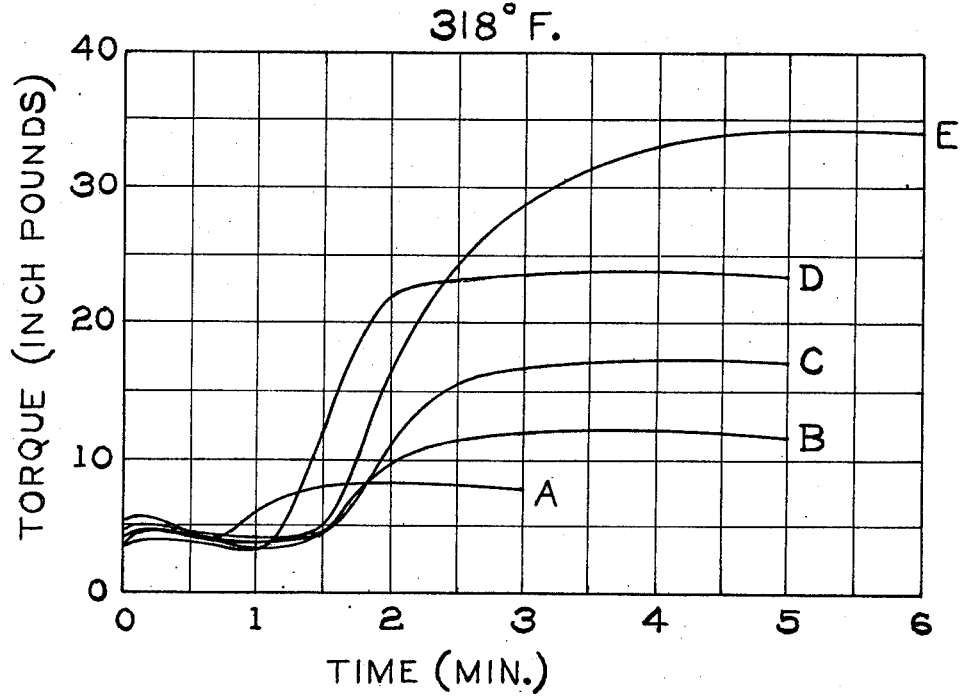
FIGURE 5 is a chart illustrating the cure curve of different samples of material.

The chart in FIGURE 5 discloses a specimen A subject to a cure at 315° F. from which a curve A is plotted. Curve B discloses a material that has greater strength than the material of curve B but it is slower curing. The material of curve C shows greater strength than that of A or B. The material of curve D discloses a shorter cure time and greater strength, while the material of curve E shows greater time necessary to develop optimum cure but it gives greater strength.

Various modifications are contemplated and may obviously be resorted to by those skilled in the art as only a preferred embodiment thereof has been disclosed.

What is claimed is:

1. An apparatus for determining the physical properties of solid and liquid vulcanizable elastomeric material comprising a pair of die members cooperative to define a test cavity to receive a test sample for testing such materials, means to move one of said die members to and from the other of said die members to exert a pressure on a sample of material held by said die members; drive means connected to said other die member and operative to impose an oscillatory shearing force on said other die member and on the material being tested, means to heat said die members to a predetermined temperature, and means for measuring the force required to oscillate said other die member.

2. An apparatus as defined by claim 1 wherein said die members are cooperative to define a hollow cone cavity with a restrictive opening along the base of said hollow cone cavity.

3. An apparatus as defined by claim 2 wherein said die members are cooperative with a housing to define a closed air chamber.

4. An apparatus for the determination of physical properties of vulcanizable elastomeric materials comprising: a pair of spaced die members; one of said die members having a cavity, the other of said die members having a pyramid projecting into said cavity to define a test chamber; means to move said one die member toward the other die member to position said pyramid into said cavity operative to maintain a pressure on a test sample positioned between said die members; means to heat said die members to a predetermined temperature; drive means having a preselected constant input operatively connected to said other die member for imposing an oscillatory rotary force and motion thereto; and means connected to said other die member for measuring the force on said other die member.

5. An apparatus for determination of physical properties of vulcanizable elastomeric material comprising a pair of die members cooperative to receive a test sample for testing such materials, one of said die members having a cone shaped cavity, the other of said die members having a cone shaped projecting member, means to move said one die member to and from said other die member to relatively move said cone shaped member into said cone shaped cavity to exert a pressure on a sample of material positioned in said cone shaped cavity; drive means connected to said other die member and operative to impose an oscillatory shearing force thereon and on the material being tested in said cavity, means to heat said members to a predetermined temperature and means for measuring the force required to oscillate said other die member.

6. An apparatus as defined by claim 5 wherein the means to measure the force includes torque responsive means cooperating with said other die member and said drive means, and recording means connected to said torque responsive means.

7. An apparatus as defined by claim 6 wherein said die members are cooperative with a housing to define a closed chamber.

8. An apparatus as defined by claim 7 wherein pressurized means are connected to said closed chamber to maintain a predetermined air pressure therein.

9. An apparatus for determining the physical properties of solid elastomeric material comprising: a pair of spaced die members; said die members having a projection and cavity cooperative to define a test chamber; means to move one of said die members toward the other die member to provide a pressure on a test sample held in said test chamber, means to heat said die members to a predetermined temperature, means to indicate the temperature of the confined material, a drive shaft connected to the other of said die members; drive means having a preselected constant input operatively connected to said drive shaft for imposing an oscillatory rotary force and motion thereto; and torque responsive means cooperating with said shaft to indicate variations in torque therein, and recording means connected to said torque responsive means.

10. An apparatus for determining the physical properties as set forth in claim 9 wherein a housing cooperates with said die members to provide a closed air chamber upon movement of said die members toward each other; and means connected to said air chamber to provide pressurized air thereto to prevent a porous cure in such test sample.

11. An apparatus for the determination of physical properties of vulcanizable elastomeric materials comprising: a pair of spaced die members; one of said die members having a cavity, the other of said die members having a pyramid projecting into said cavity to define a test chamber; means to move said one die member toward the other die member to position said pyramid into said cavity operative to maintain a pressure on a test sample positioned between said die members; means to heat said die members; drive means having a preselected constant input operatively connected to said other die member for imposing an oscillatory rotary force and motion thereto; means connected to said other die member for measuring the force on said other die member; and said pyramid having an annular lip cooperative with the upper end portion of said cavity upon projection of said pyramid into said cavity to provide a substantially closed cavity.

References Cited

UNITED STATES PATENTS

| 2,027,903 | 1/1936 | Dintilhac | 73—60 |
| 2,037,529 | 4/1936 | Mooney. | |
| 2,305,531 | 12/1942 | Hurndall | 73—60 |
| 3,182,494 | 5/1965 | Beatty et al. | 73—59 XR |
| 3,387,490 | 6/1968 | Wise | 73—59 XR |

LOUIS R. PRINCE, Primary Examiner

H. C. POST III, Assistant Examiner

U.S. Cl. X.R.

73—59, 101